United States Patent
Chakrabarty et al.

(10) Patent No.: US 10,818,050 B2
(45) Date of Patent: Oct. 27, 2020

(54) VECTOR GRAPHIC FONT CHARACTER GENERATION TECHNIQUES

(71) Applicant: Adobe Inc., San Jose, CA (US)

(72) Inventors: Saikat Chakrabarty, Noida (IN); Himanshu Aggarwal, Rohini (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/271,598

(22) Filed: Feb. 8, 2019

(65) Prior Publication Data
US 2020/0258273 A1 Aug. 13, 2020

(51) Int. Cl.
*G06T 11/20* (2006.01)
*G06K 9/00* (2006.01)
*G06T 11/60* (2006.01)
*G09G 5/24* (2006.01)
*H04N 21/431* (2011.01)

(52) U.S. Cl.
CPC ........ *G06T 11/203* (2013.01); *G06K 9/00228* (2013.01); *G06K 9/00302* (2013.01); *G06T 11/60* (2013.01); *G09G 5/24* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 9,760,763 B2* | 9/2017 | Choi | G06K 9/00268 |
| 10,621,422 B2* | 4/2020 | Kim | G10L 21/06 |
| 2012/0079374 A1* | 3/2012 | Gaddis | G06F 16/9577 715/269 |
| 2017/0372455 A1* | 12/2017 | Winnemoeller | G06T 11/203 |
| 2019/0126152 A1* | 5/2019 | Taylor | H04L 51/10 |

\* cited by examiner

*Primary Examiner* — Jwalant Amin
(74) *Attorney, Agent, or Firm* — SBMC

(57) ABSTRACT

Vector graphic font generation system implemented as part of a computing device is described. The system is configured to improve generate vector graphic font characters by detecting an object within a digital image, segmenting the digital image extract the facial region within the digital image, generating a vector graphic by converting a format of the segmented digital image into a scalable vector format, mapping the vector graphic with Unicode characters, and subsequently mapping the Unicode character with a glyph identifier. The vector graphic font generation system described herein enables the expression of a wide spectrum of emotions in numerous applications using font characters that precisely match the object, e.g., facial appearance of users as depicted in digital images.

20 Claims, 10 Drawing Sheets
(7 of 10 Drawing Sheet(s) Filed in Color)

VECTOR GRAPHIC FONT CHARACTER GENERATION TECHNIQUES

BACKGROUND

Modern computing devices, such as laptops, cellphones, PDAs, and so forth may be used to engage in a wide variety of communications, examples of which include transmitting and receiving telephone calls, textual communications, and so on. In addition, with advances in digital content creation techniques, users may transmit an ever expanding variety of digital content, such as digital images, digital videos, emoticons, emojis, animojis, and so forth.

Emojis, emoticons, and animojis are ubiquitous in modern day communications and are used to expand the ways in which users' expressions and emotions are captured. Emojis and emoticons are digital images that typically depict cartoon-like pictorial representations of various facial expressions, e.g., smiling faces, frowning faces, and stoic expressions. Animojis are emojis that are altered (e.g., animated) to give an appearance of movement. Emojis, animojis, emoticons, and other such digital content enable users of computing devices to express of a wide spectrum of thoughts and emotions that would otherwise be difficult or impossible to express with textual communications alone, e.g., sarcasm.

While emojis, emoticons, and animojis enable users to convey a broader spectrum of emotions, conventional techniques of generating such digital content suffer from various limitations. In particular, conventional techniques do not have the capability to design emojis in vector graphic form such that the emojis match a user's unique facial appearance as shown in a digital image. Moreover, conventional techniques lack the functionality to convert a format of a vector graphic and generate a font character based on the vector graphic. Consequently, conventional techniques are limited to specialized instances and are not accessible in wide variety of applications and environments. The inability of conventional techniques to create vector graphic font characters that support limited customization through selection or preconfigured options limit digital design creativity and user accessibility. Conventional techniques also result in operational inefficiencies of the computing device that result from repeated user attempts to overcome these challenges.

SUMMARY

Vector graphic font character generation techniques are described herein that are configured to facilitate generation of font characters by a computing device that are customizable for particular objects, such as to match a user's face as depicted in a digital image. In one example, a vector graphic font generating system, as implemented by a computing device, is configured to first receive a digital image that includes an object that is to be a subject of a vector graphic font character, e.g., a facial region of a user. While a digital image is discussed for illustrative purposes, other types of digital content can also be received, such as a digital video stream of digital images. The vector graphic rendering system is then configured to detect the facial region included in the digital image using a boundary indicator. In one example, the boundary indicator appears in a user interface as a colored box that demarks a perimeter of the facial region in the digital image. If a digital video stream is received, the boundary indicator appears as a colored box that tracks and demarks the perimeter of the facial region in real time.

Next, the vector graphic font generating system segments the digital image by first detecting the object, e.g., a facial region within the digital image. The segmentation process modifies the digital image such that excess portions within the boundary indicator that do not relate to the object, e.g., a user's face or facial region, are removed. Thereafter, the system converts the segmented digital image's format (e.g., a raster format such as a bitmap) into a vector format, i.e., a vector graphic.

Next, the system generates a font character from the vector graphic that matches the object, e.g., the user's face as it appears in the digital image. In this way, the font character may be based directly on a facial expression of a user that is included in the facial region of the digital image, e.g., a user's expressions of frowning, smiling, stoic, and so forth. The generation of the font character includes mapping the vector graphic to a Unicode character and mapping the Unicode character to a glyph identifier. The mapping of the Unicode character to a glyph identifier is then stored in a character to glyph correspondence table. The generated font character can then be accessed from a glyph index table that stores pictorial representations of accessible fonts, including the generated vector graphic font character. From the glyph index table, for instance, a selection may be received of the newly generated font character, which is then output on a display of the computing device. In this way, the vector graphic font generating system overcomes the limitations of conventional techniques, namely the inability of these techniques to generate vector graphic fonts that are customizable and personalized to match an object, such as a user's face as depicted in a digital image and use of these vector graphics through configuration as a font character.

This summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawings(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
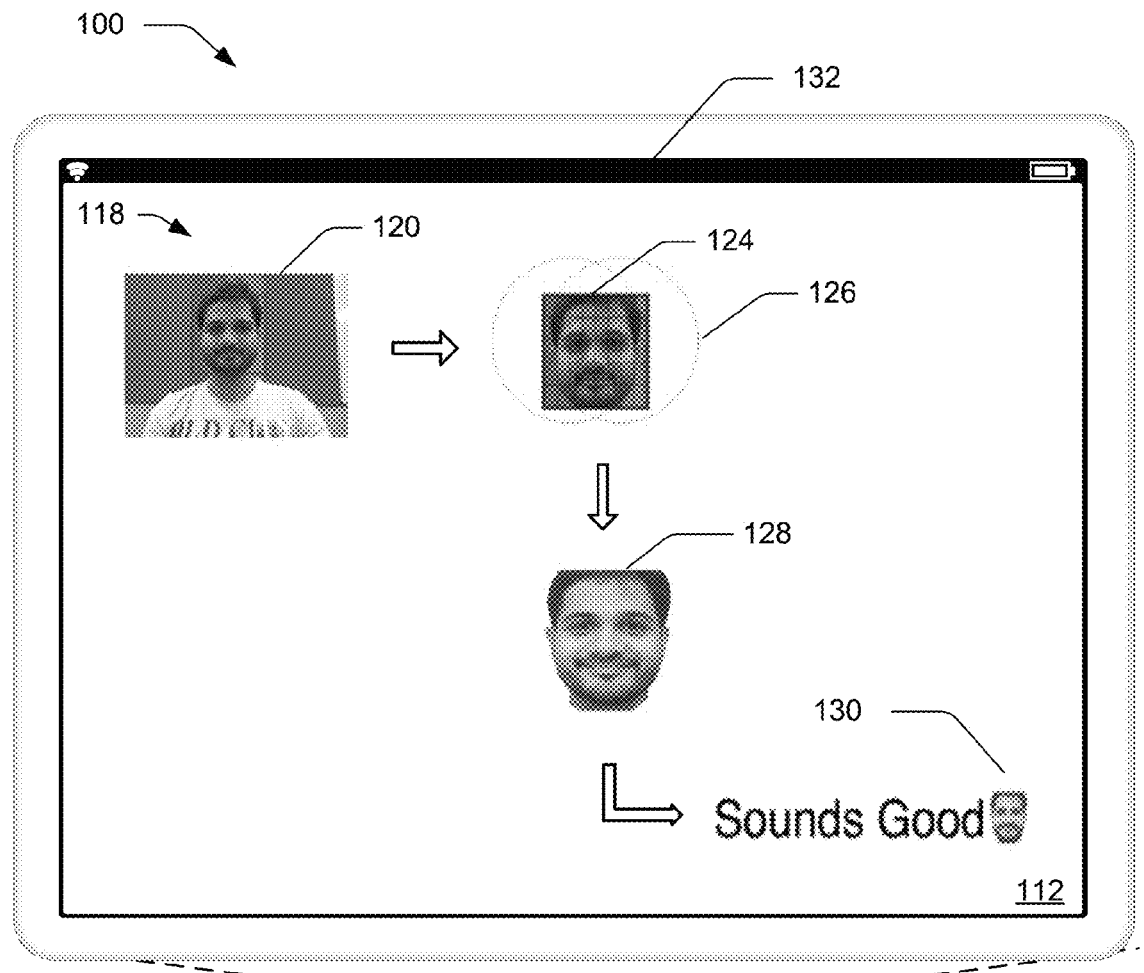
FIG. 1 is an illustration of a vector graphic font generation system operable to generate a vector graphic font character that matches a user's facial expression as depicted in a digital image.
Figure 1:
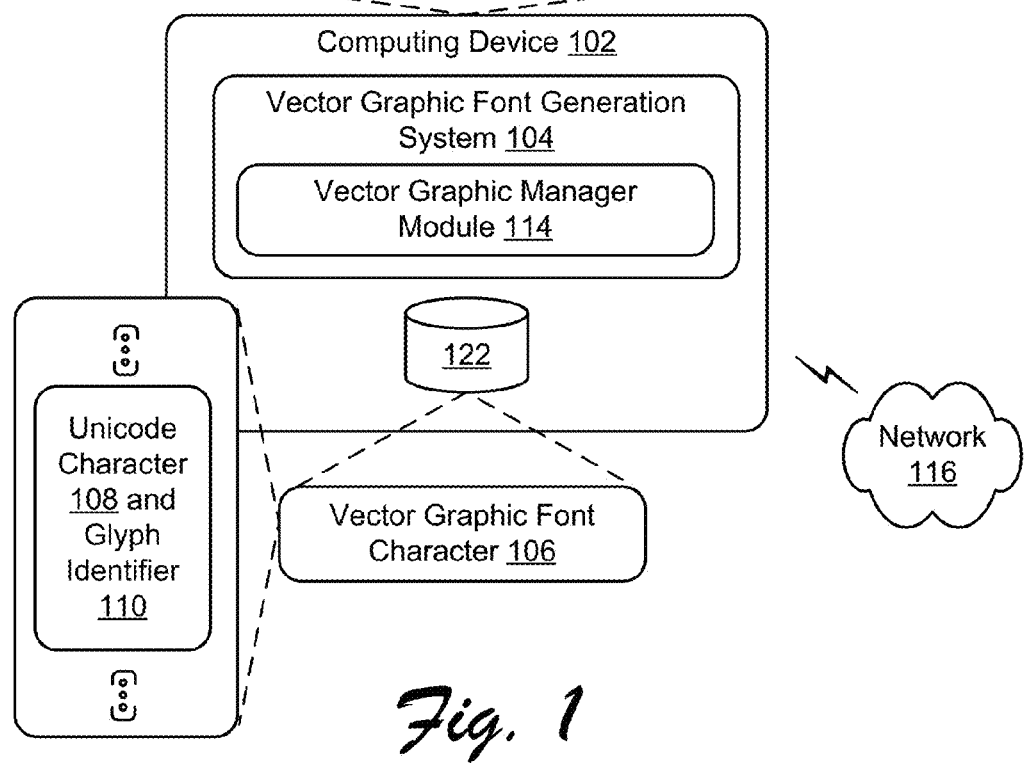

Conventional emoji generation techniques suffer from numerous limitations. As stated, emojis with intricate design configurations often accompany textual communications or are used in place of text communications to convey a wide spectrum of thoughts and emotions that may be difficult to express otherwise, e.g., using text alone. Emojis, as described above, are typically implemented as images that depict various smiling, frowning, stoic, and a variety of other facial expressions and emotions. While a broad spectrum of emotions are captured by emojis, conventional emoji generating techniques have drawbacks. Specifically, these emojis do not match a particular user's unique face or facial expression as depicted in a digital image. Conventional emojis are generalized cartoon-like approximations of facial expressions that can be applicable to a wide range of users. Conventional techniques also do not have the functionalities to convert an emoji into a font character that is stored in vector graphic format. Storing a font character in vector graphic format enables font character accessibility within numerous applications and environments. As such, the ability of users to express a variety of emotions in various applications and environments using font characters that match a user's facial expressions is inhibited. Additionally, any traditional emoji that is rescaled or adjusted loses its image quality and resolution.

Accordingly, a vector graphic font generation system is described that is configured to support generation of vector graphic font characters that match a facial appearance and expression of a user as depicted in a digital image. In one example operation of the system, a digital content reception module of the vector graphic font generation system is configured to receive a digital image that includes an object, which is a facial region of a user in the following example, but other animate or inanimate objects are also contemplated. The facial region includes the user's facial expression. While a single digital image is described in this example, the system is also configured to receive the digital image as part of a digital video stream.

From this, a detection module of the system detects the user's facial region within a boundary indicator, which may or may not be displayed in a user interface. The boundary indicator, for instance, may appear as a colored box in the user interface that demarks the perimeter of the facial region included in the digital image. If a digital video stream is received, the boundary indicator dynamically tracks the user's facial region, updating its location with any detected change in user movement. After which, a segmentation module of the system segments the digital image responsive to detecting the facial region. Segmentation includes removing portions of the digital image within the perimeter of the boundary indicator that is not associated with the facial region of the user. In other words, the areas not related to the facial region, such as objects, colors and so on in the background of the facial region are filtered out of the segmented digital image. As a result, the segmentation precisely identifies and extracts the user's facial region within the digital image.

From this, a vector graphic generation module of the system generates a vector graphic by converting a format of the segmented digital image into a vector graphic format. In one example, the format of the digital image is converted from a raster format into a vector graphic format. A vector graphic format (e.g., a scalable vector graphic (SVG) format, an AutoCAD drawing exchange format, a Windows metafile and enhanced metafile format, an encapsulated PostScript, portable document format, and so on) varies from other types of image formats in that this format is defined mathematically to enable the system to scale the vector graphic while maintaining the digital image's resolution and quality.

From this, a font character generation generates a font character based on the vector graphic. Specifically, the font character generation module maps the vector graphic to a Unicode character and then maps the Unicode character to a glyph identifier. The Unicode character to glyph identifier mapping is subsequently stored in a character to glyph correspondence table, which is described in further detail below. Finally, an output module of the vector graphic font generation system outputs the font character on a display of a computing device. In an example operation, the outputting of the font character involves user selection of the font character from a glyph index. The glyph index is a table that indexes a plurality of font character, each of which are selectable by the user for display in a user interface.

In this way, the vector graphic font generation system addresses the limitations in conventional techniques of generating emojis and emoticons. Specifically, the system described herein addresses limitations present in conventional techniques by generating emojis that match a user's facial expression as depicted in a digital image and converting the generated emoji into a vector graphic. This supports the resizing and adjustment of the emoji without sacrificing image quality or resolution. A font character may then be generated from the vector graphic and is accessible in a variety of applications and environments. As such, the vector graphic font generation system allows users to convey a wide spectrum of thoughts and emotions in numerous applications and formats using font characters that match the facial expressions of users as depicted in a digital image. Although facial expressions and user faces are described, it should be readily apparent that a wide variety of objects may be identified in a digital image and used to generate a vector graphic usable as an emoji.

In the following discussion, an example environment is described that may employ the vector graphic font generation system described herein. Example procedures are also described which may be performed in the example environment as well as other environments. Consequently, performance of the example procedures is not limited to the example environment and the example environment is not limited to the performance of the example procedures.

Term Descriptions

As used herein, "Unicode Character" defines a manner in which individuals characters are represented in text files, webpages, and various types of documents. Unicode is a universal character encoding standard designed to support approximately 1,000,000 characters. The Unicode character encoding standard provides a unique number for every character, e.g. letters, punctuations, fonts etc. for a variety of platforms, devices, applications, and languages. Computers store each of these characters in association with a unique Unicode number in the computer's memory.

As used herein, "Glyphs" refer to an elemental symbol within an agreed group of symbols intended to represent a readable character for writing purposes. Each glyph represents the shapes of characters, including fonts, when they are rendered or displayed. For example, a glyph's shape can be defined by a combination of curve and line segments. The curves and segments defining a glyph can be based on Bezier curves.

As used herein, a "CMAP" table or "character to glyph index mapping table" defines the mapping of character codes to glyph index values used in the font. The mapping of the Unicode character codes with a particular glyph index value or glyph identifier is required for correct functioning of fonts.

As used herein, "Glyph identifiers" or "Glyph Index Values" are numeric identifiers allocated to each glyph ranging from 0 to N−1, wherein N is the number of glyphs contained in the particular font.

As used herein, "Font" or "Font characters" refer to a graphical representation of text that may include a different typeface, point size, weight, color, or design.

As used herein, "OpenType Fonts"® is a cross-platform font file format that supports a wide range of character sets and layout features, which provide for rich linguistic support and advanced typographical control. OpenType® provides font designers with a flexibility to generate pictures, icons, and emojis as font characters.

As used herein, "Scalable Vector Graphic Format" or ("SVG") is a vector image format for two-dimensional graphics that supports interactivity and animation. Digital content converted to SVG format are supported under a wide variety of browsers and applications. Additionally, the SVG format enables for the scalability of the digital content while maintaining the content's quality and resolution.

As used herein, "Digital smoothing" of a digital image refers to filtering an image such that the image appears less pixelated. In other words, a digital smoothing effect enhances the clarity and resolution of a digital image.

As used herein, "Digital color overlay" refers to a solid or mixed color combination that appears on top of a particular digital image. The opacity of the digital color overlay is a feature that accompanies the digital color overlay and controls the transparency of the digital color overlay. The higher the opacity, the less transparent the color overlay. The lower the opacity, the more transparent the color overlay.

Example System and Device

FIG. 1 is an illustration of the vector graphic font generation system 104 in which unique vector graphic font character generation techniques are employed. The environment 100 illustrates example operation 118 of system 104 as implemented by computing device 102.

The computing device 102, for instance, may be configured as a desktop computer, a laptop computer, a mobile device, e.g. assuming a handheld configuration such as a tablet or mobile phone as illustrated, and so forth. Thus, the computing device 102 may range from full resource devices with substantial memory and processor resources 122 (e.g. personal computers, game consoles) to a low-resource device with limited memory and/or processing resources (e.g. mobile device). Computing device 102 is representative of a single computing device or a plurality of different devices, such as multiple servers utilized by a business to perform operations "over the cloud" as described in FIG. 8. Additionally, although illustrated as implemented locally at computing device 102, functionality of vector graphic font generation system 104 may also be implemented as whole or part via functionality available via the network 116, such as part of web service or "in the cloud."

The computing device 102 is illustrated as including vector graphic font generation system 104. In one example, the vector graphic font generation system 104 is implemented at least partially in hardware of computing device 102 to generate a vector graphic font characters that are designed based on an object detected in a digital image, such as to match a user's face as depicted in the digital image. In the illustrated example, a digital image includes an object, which in this instance is a user's facial region, is received and subsequently processed by the system to generate a vector graphic font character 106 that matches the user's facial expression as depicted in the digital image. An example of the digital image as processed by the vector graphic font generation system 104 is illustrated as vector graphic font character 130 that matches the facial expression of a user as depicted in a digital image 120. Vector graphic font character 130 is generated as a result of the system processing of digital image 120 in the manner described above.

As previously stated, conventional emoji and emoticon generation techniques lack a capability of generating an emoji that matches a user's unique face or facial expression as depicted in a digital image. Instead, conventional systems create generalized cartoon like depictions of facial expressions that can be applicable generally to a wide range of users, and thus do not support personalization to particular users or other objects. Moreover, conventional techniques fail to generate fonts based on these generalized cartoon like depictions in scalable vector format. Consequently, resizing or adjusting these emojis without losing image quality or resolution is not feasible. Moreover, such emojis are not easily accessible and editable in a variety applications and environments.

Vector graphic font generation system 104 addresses these challenges and generates vector graphic font characters that mirror characteristics of an object, e.g., a facial appearance and expressions of users as depicted in digital images. To achieve this, a vector graphic manager module 114 of the vector graphic font generation system 104 receives a digital image 120 or a digital video stream that includes a facial region of a user. From the receive digital image 120, the vector graphic manager module 114 detects the facial region with a boundary indicator depicted in the form of a red box that demarks the perimeter of the facial region. While a red box is contemplated, other shapes, forms, and colors may be utilized. Moreover, in an example where a digital video stream is received by vector graphic manager module 114, the boundary indicator tracks movement of the user's facial region in real time.

From this, the vector graphic manager module 114 performs a segmentation of the digital image. In operation, the segmentation operation is performed in several steps. First, a plurality of cells are generated within the boundary indicator such that the cells 124 overlay the facial region. As depicted, the cells appear as a grid over the facial region. Second, the system generates markers 126 associated with the facial region, which in this example, appears as a set of intersecting circular shapes. While circular shapes are depicted, other shapes, designs, and configurations can serve as markers as well. The intersecting circular shapes define an overlapping portion that more accurately defines the user's facial region. Third, the vector graphic manager module 114 identifies the overlapping portion and extracts this portion. Finally, the vector graphic manager module 114 implements a partitioning algorithm on the extracted portion. In this way, the vector graphic manager module 114 segments the digital image using cells 124 and markers 126.

After digital image segmentation, the vector graphic manager module 114 generates a vector graphic 128 from the segmented digital image by converting a format of the segmented digital image to a Scalable Vector Graphic (SVG) format. As stated, conversion to an image into a vector graphic has several distinct advantages—including rescaling and resizing the image without reduction in the quality and resolution of the digital image. Additionally, converting the segmented image into SVG format is beneficial because this format is supported by a number of browsers and applications. Vector graphics in SVG format can also be readily embedded in OpenType SVG fonts.

Next, the vector graphic manager module 114 generates a font character from the vector graphic by mapping the vector graphic with a Unicode character and mapping the Unicode character with a glyph identifier. The mapping of the Unicode character 108 with the glyph identifier 110 is stored in a character to glyph correspondence table, described above. Finally, the font character generated in vector graphic format is displayed on and is accessible to a user within table known as a glyph index. The user may select the vector graphic font character 130 from the glyph index, e.g. through use of a "tap" gesture or a "click" operation performed on the font character via user interface 112. From this, the vector graphic manager module 114 outputs the font character 130 onto user interface display device 132 of computing device 102. In the illustrated example, the example font character 130 matches the facial expression of a user as depicted in digital image 120 and appears adjacent to text that can be included within, e.g. a word document or other similar applications.

In this way, the vector graphic font generation system 104 addresses the limitations present in conventional techniques. In particular, the inability of these techniques to generate vector graphic font characters that match a user's facial expression and appearance as depicted in a digital image, and are capable of being displayed in a number of different applications and products, e.g. browsers, word documents, etc.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Vector Graphic Font Generation

Figure 2:
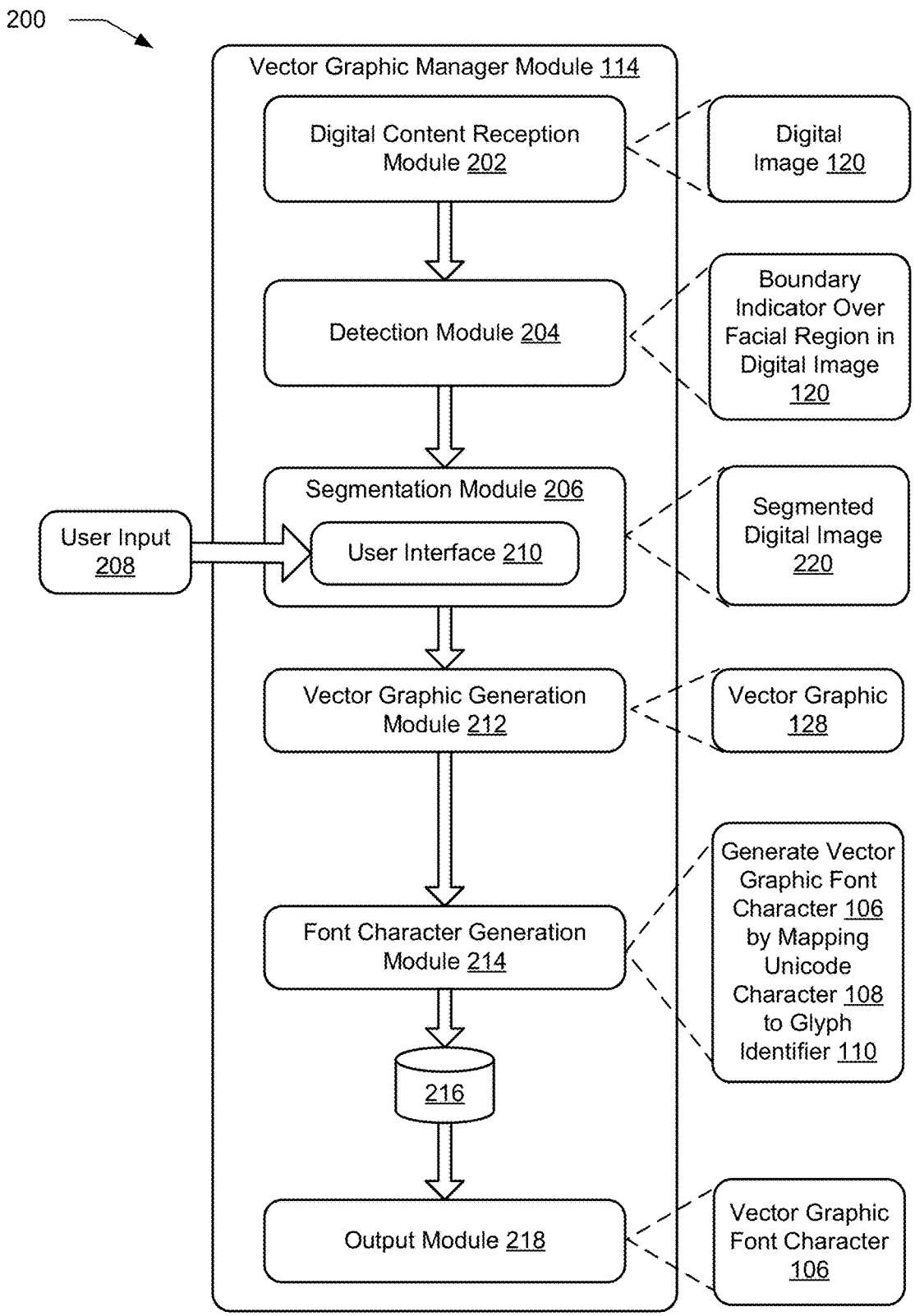
FIG. 2 depicts an example illustration of a vector graphic manager module within the vector graphic rendering system that includes a digital content reception module, a detection module, a segmentation module, a vector graphic generation module, a font character generation module, and an output module in greater detail to support vector graphic font character generation techniques.
Figure 3:
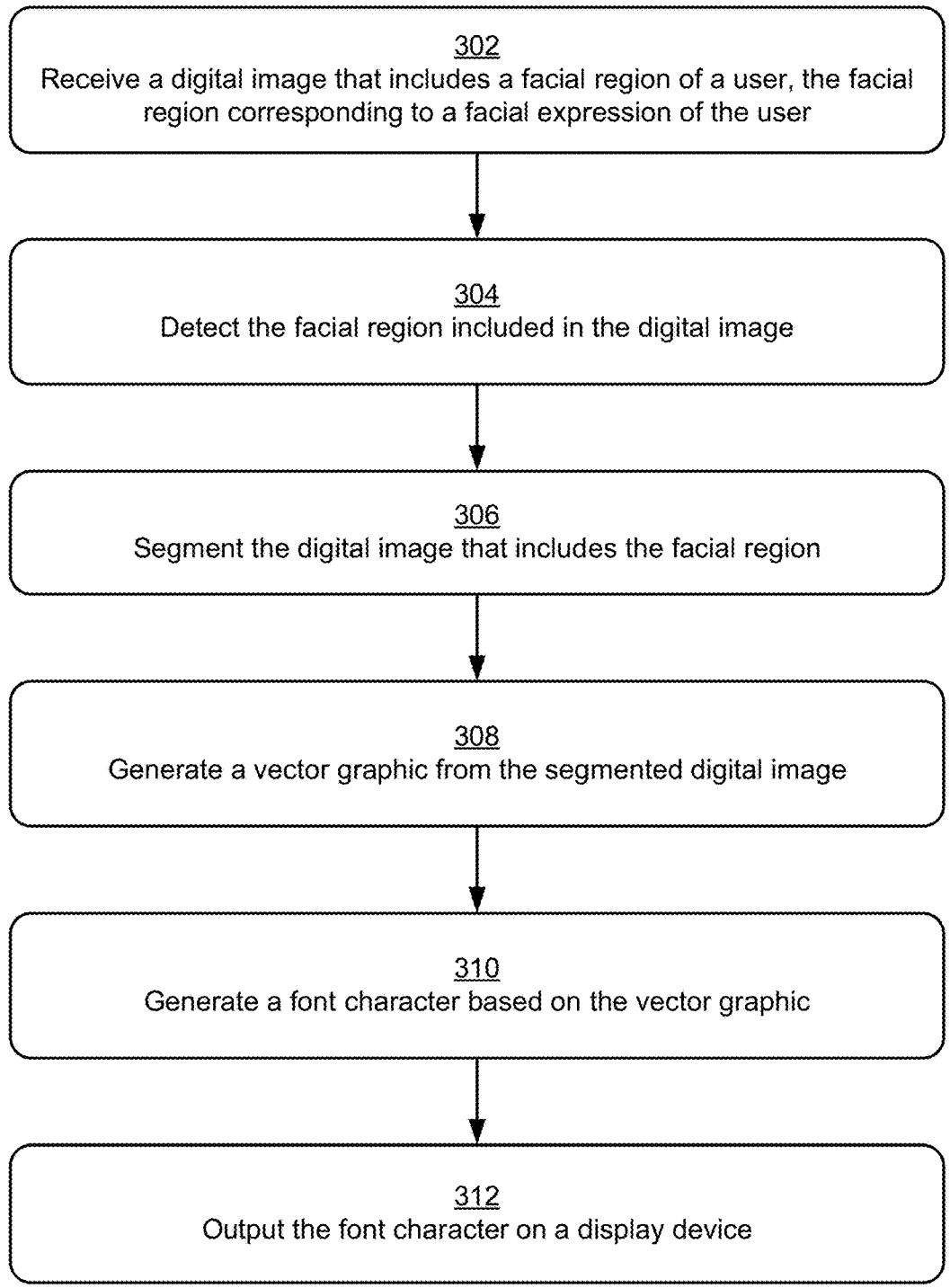
FIG. 3 depicts a flow diagram depicting an example procedure to generate a vector graphic font character that matches a user's face as depicted in a digital image.

FIG. 2 depicts a system 200 in an example operation of the vector graphic manager module 114 of vector graphic font generation system 104 is shown in greater detail. FIG. 3 depicts a procedure 300 in an example of the vector graphic font character generation techniques described herein.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-8.

Figure 4A:
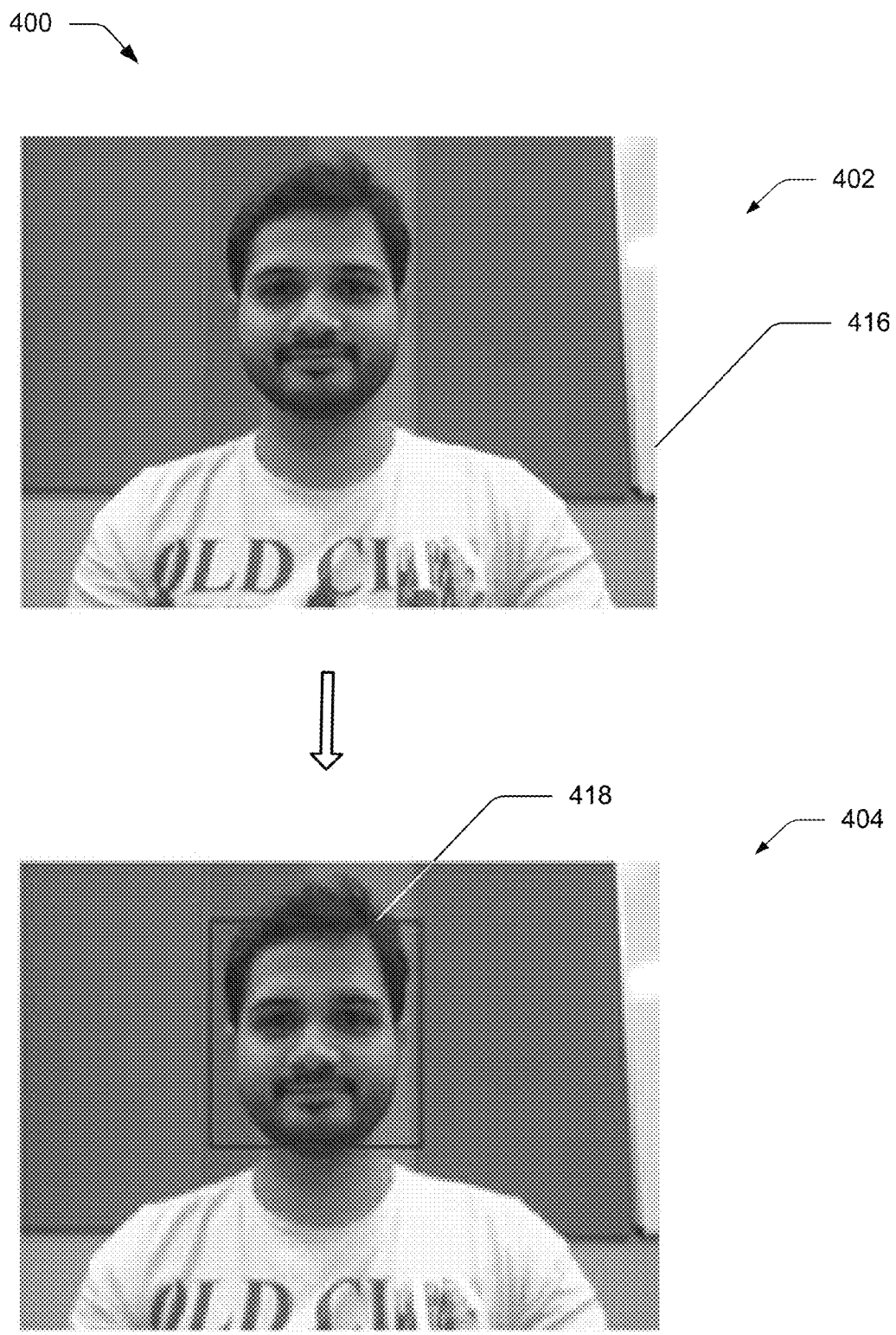
FIG. 4A-4C depicts an example set of steps performed by the vector graphic font character generation system to generate a vector graphic based font character that matches a user's face as depicted in a digital image.
Figure 4B:
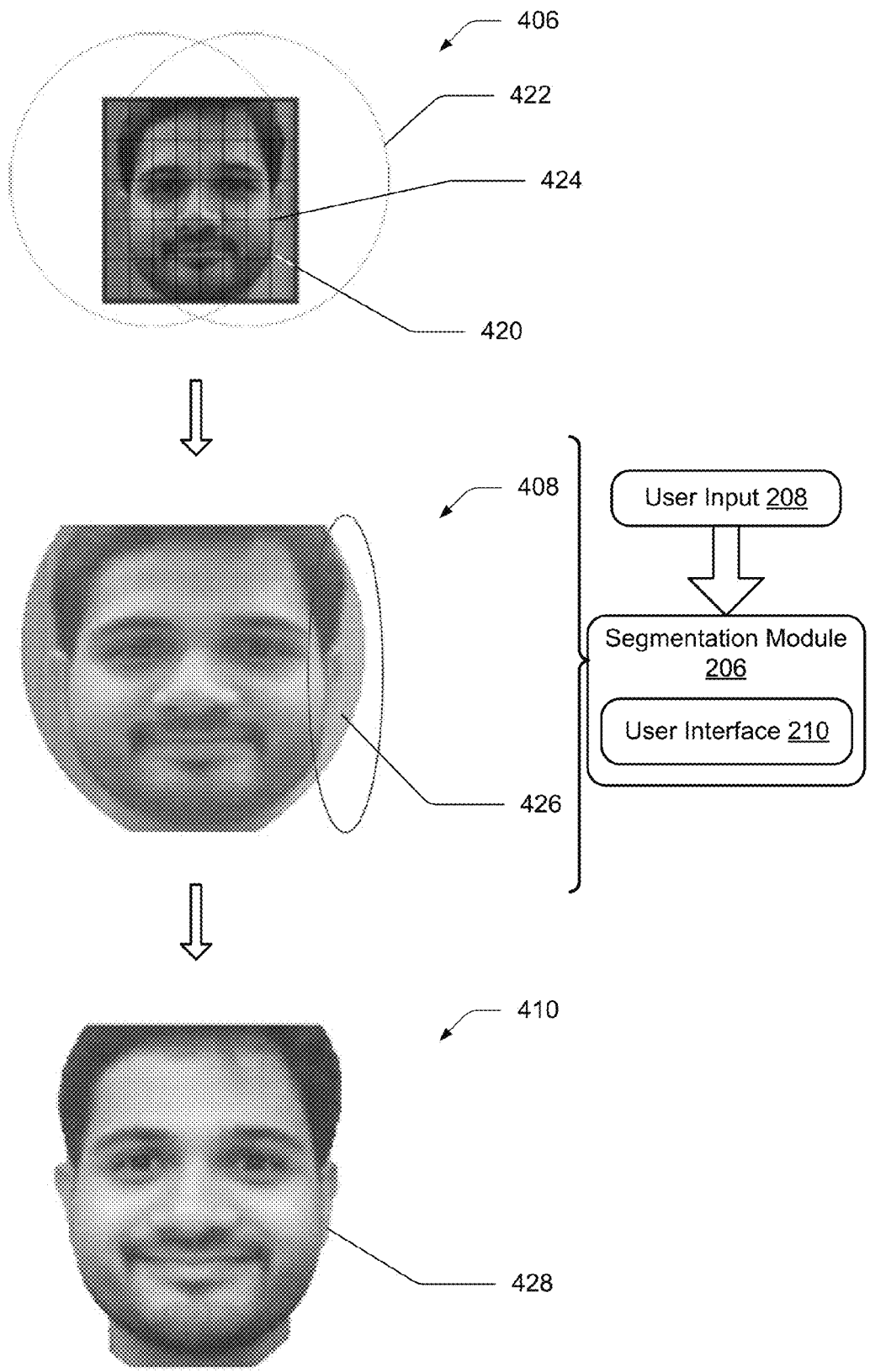
Figure 4C:
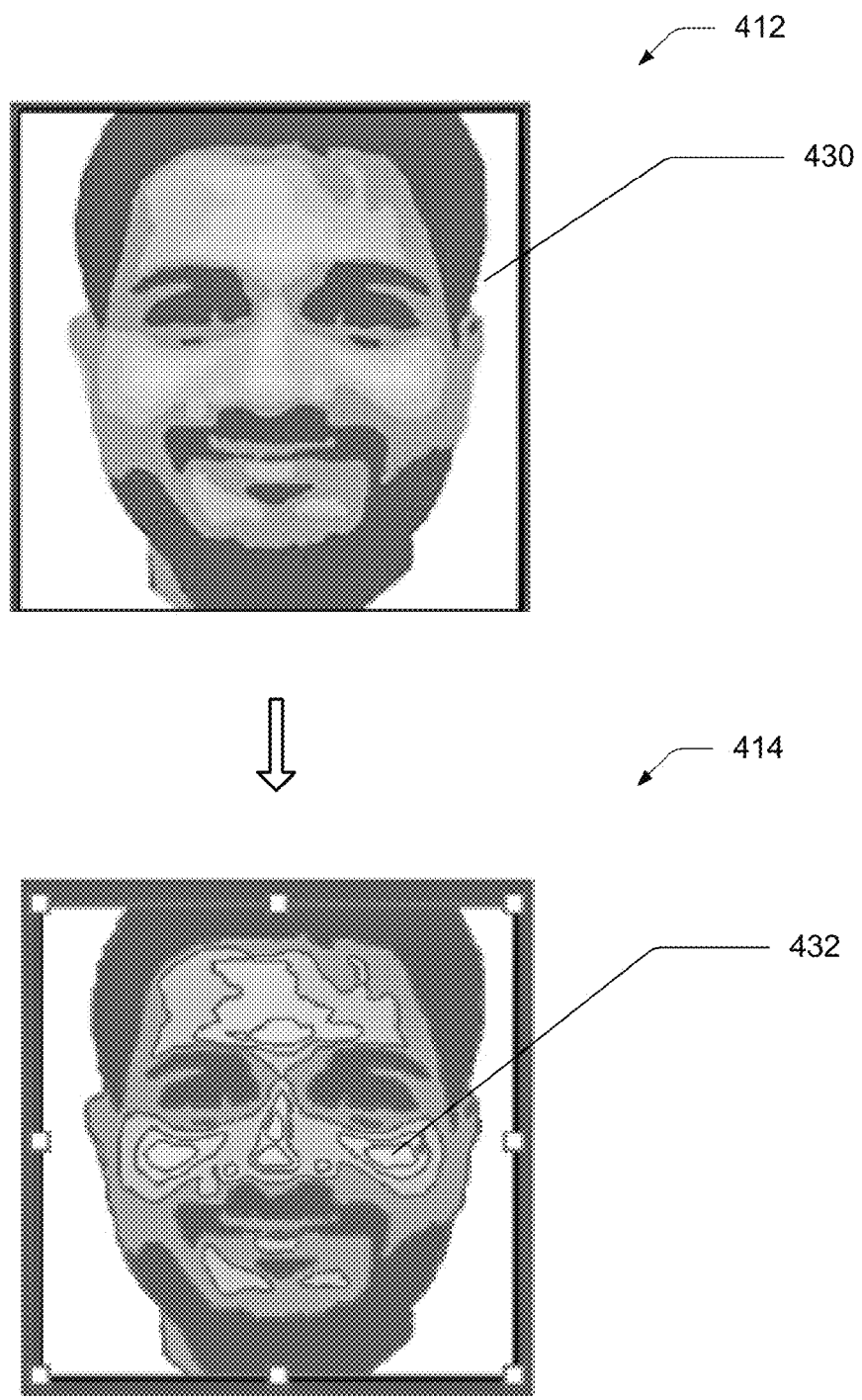

FIGS. 4A-4C depicts example operation 400 of vector graphic font generation system 104 being performed the modules depicted in FIG. 2. Example operation 400 is shown in first, second, third, fourth, fifth, sixth, and seventh stages 402, 404, 406, 408, 410, 412, and 414 in FIGS. 4A-4C. Although the following discussion describes detection of a facial region of a user, a variety of other objects may also be detected within a digital image and used to generate a vector graphic as part of the described vector graphic font character generation techniques.

At first stage 402, a digital content reception module 202 of the vector graphic font generation system 104 receives a digital image 416 that includes a facial region of the user (block 302). The facial region corresponds to a facial expression of the user. As shown, first stage 402 shows digital image 416 with an individual presented from head to chest against a multi-colored wall in the background. The individual's smiling facial expression is clearly visible. From this, at second stage 404, a detection module 204 detects the facial region of the user (block 304). In one example operation of the system, a boundary indicator is used to detect user's facial region within the digital image. As depicted in second stage 404, the boundary indicator 418 appears as a red bounding box that demarks the perimeter of the user's facial region. In addition to the user's face, however, portions of the purple and white background are also visible within the bounding box. These portions are subsequently filtered or segmented by the vector graphic font generation system 104 in subsequent processing steps implemented by the system.

Specifically, after detecting the facial region in the digital image, segmentation module 206 segments the digital image such that the portions other than the user's face are filtered (block 306). In other words, the segmentation module removes areas outside the facial region, including, e.g. objects, colors, etc., in the background of the facial region. The segmentation module 206 segments the digital image in multiple steps. At third stage 406, the segmentation module 206 generates cells 420 that appear over the user's facial region within the boundary indicator. Specifically, the cells 420 appear in a grid like pattern overlaying the facial region. Then, markers 422 are generated and displayed on cells 420 such that an overlapping portion 424 is identified based on the intersection of these markers. Specifically, the overlapping portion 424 is defined as the area within the intersection of the two red colored circles, within which the user's facial region is found.

From this, at fourth stage 408, segmentation module 206 extracts overlapping portion 424 from the digital image as part of the segmentation process. In one example operation of vector graph font generation system, the extraction of the overlapping portion by the segmentation module 206 can be initiated based on a user input 208, received via interaction with user interface 210 through, e.g. cursor control device, gestures, and so forth. The user may select the overlapping portion by "clicking" on the overlapping portion as well. The segmentation module 206 subsequently performs the extraction. The overlapping portion 424 that is extracted includes areas other than the facial region of the user. In particular, as shown in fourth stage 408, these areas capture orange, pink, and grey colors in the background of the facial region beyond the user's facial region. As such, the overlapping potion 424 depicts a face clipping of the user that is not precise.

From this, at fifth stage 410, the segmentation module 206 implements a partitioning algorithm on the imprecise overlapping portion 424. The partitioning algorithm, in this example, removes excess portions 426 that do not form part of the user's face or facial region—the orange, pink and grey colors in the digital image's background. The partitioning algorithm's implementation results in a face clipping 428 of the user that precisely traces the user's facial region. In other words, objects, colors, etc. from the digital image's background are filtered out. In one example, a user may select areas beyond the facial region in the segmented image and "click" on these areas. As a result, the area beyond the facial region, e.g. colors, objects, etc. in the background of the facial region, are removed. In this way, segmentation module 206 generates segmented digital image 220, e.g., face clipping 428 as depicted in fifth stage 510.

From this, at sixth stage 412, vector graphic generation module 212 converts a format of the overlapping portion, which is defined by the precise face clipping of the user, to a Scalable Vector Graphic (SVG) format in order to generate a vector graphic 430 from face clipping 428 (block 308). In one example, the face clipping 428 of the digital image 120, initially in raster format (e.g., a bitmap), is converted into SVG format. This conversion enables the vector graphic font generation system 104 to rescale and resize the face clipping 428 without a loss in image quality or resolution. Moreover, as stated, SVG format has the added benefit of being widely supported within a number of browsers, applications, and environments. Vector graphics in SVG format can also be readily embedded in OpenType SVG fonts. At seventh stage 414, the vector graphic 430 is shown to includes a variety of subparts 432—highlighted portions within the facial region—that are selectable.

Next, the font character generation module 212 generates a font character associated with the facial expression of the user based on the vector graphic 430 (block 310) (not shown).

Figure 5:
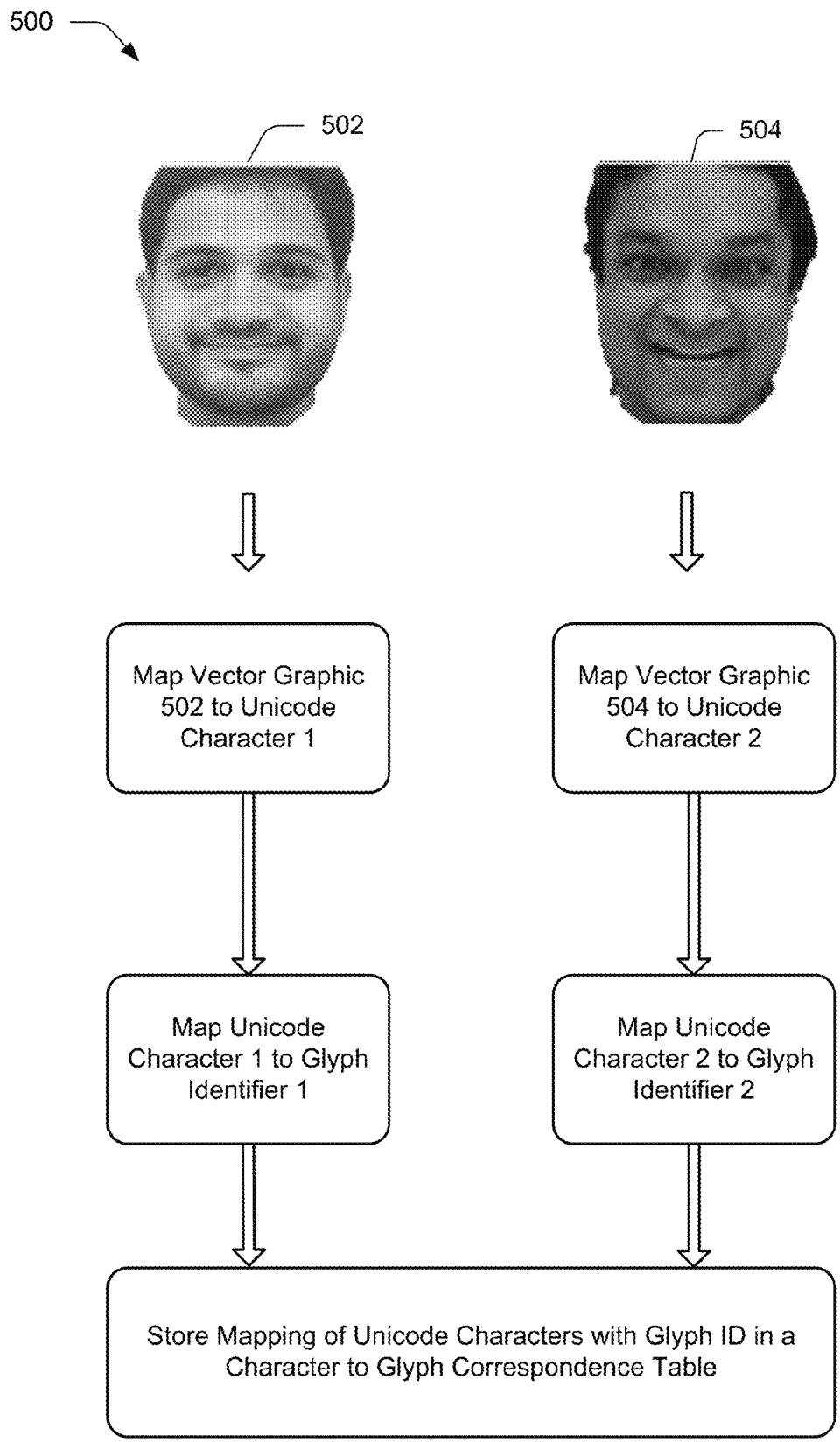
FIG. 5 depicts multiple mapping operations performed by the vector graphic generation that includes mapping a vector graphic of a segmented digital image depicting a user's face with a Unicode character and then mapping the Unicode character with a glyph identifier.

FIG. 5 depicts the steps performed by the font character generation module 214 to generate font characters from vector graphics 502 and 504 in example operation 500 of vector graphic font generation system 104. First, the vector graphics 502 and 504 would each be mapped to Unicode characters 1 and 2 respectively. Thereafter each of the Unicode characters will be mapped to respective glyph identifiers 1 and 2. The mapping of the glyph identifiers to the Unicode characters is stored in a character to glyph correspondence table. Such a table, as described in the terms section above, is called a character to glyph index mapping table or ("CMAP") table. In this way, vector graphic font characters 502 and 504 are generated that match the facial appearance and expression of users as depicted in digital images. Next, output module 218 of vector graphic font generation system 104 outputs the generated font characters on a display of computing device 102 (block 312).

Figure 6:
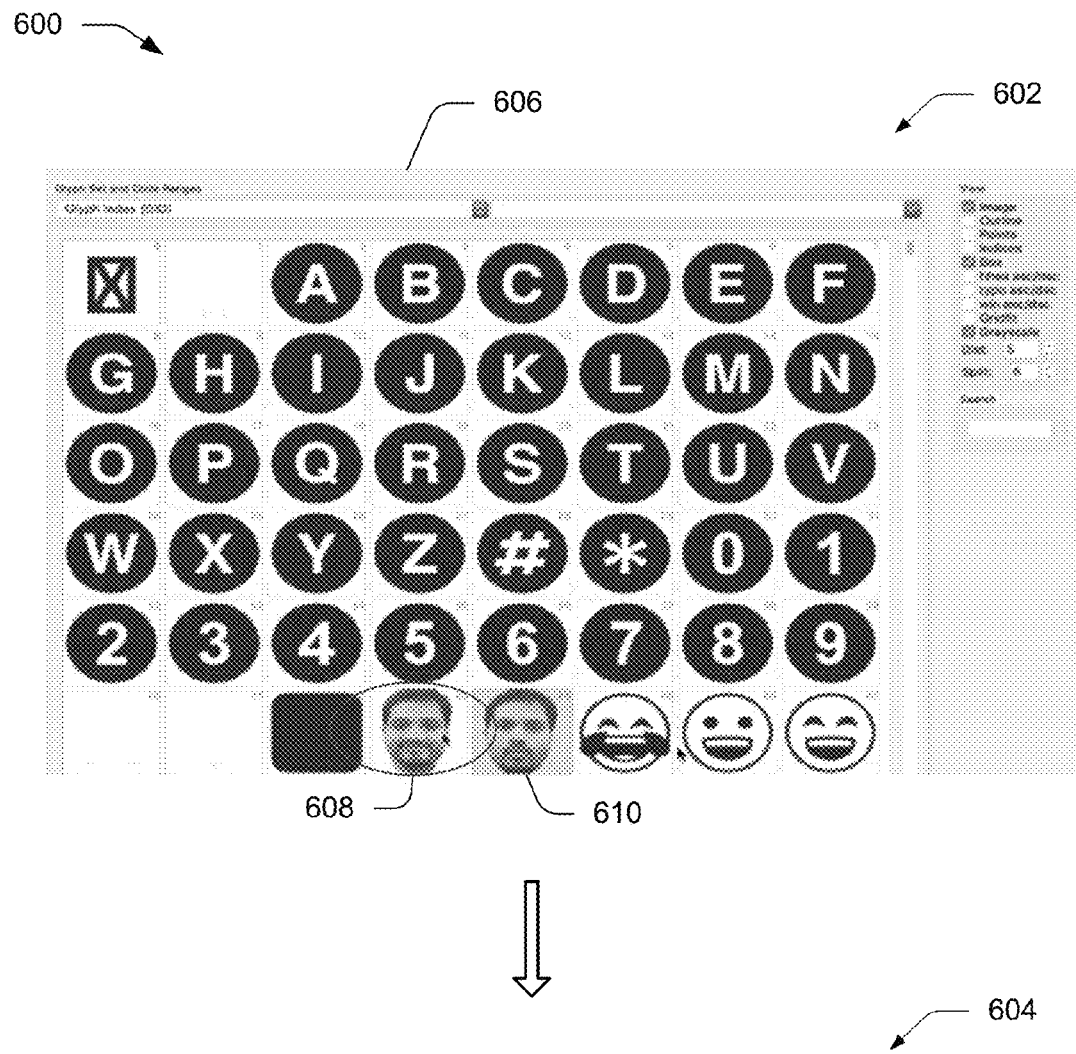
FIG. 6 depicts a glyph index that stores a plurality of font character, including the generated vector graphic font character that matches a user's face as depicted in a digital image. A computing device can access this font character via the glyph index table, which stores and displays a plurality of font characters.

FIG. 6 depicts an example operation of the vector graphic font generation system 104 displaying a generated font character on the display of computing device 102. Example operation 600 is shown in first and second stages 602 and 604 with respect to FIG. 6. At first stage 602, font characters 608 and 610 are shown as entries within a glyph index 606, which displays a plurality of font characters. In one example, after a user selects font character 608, e.g., by clicking on the font character using a gesture, output module 218 outputs font character 608 on display of computing device 102. As shown in second stage 604, font character 608 appears adjacent to text. In this way, a vector graphic font character that matches the facial appearance and expression of a user as depicted in a digital image is generated and displayed on a display of the computing device 104.

Figure 7:
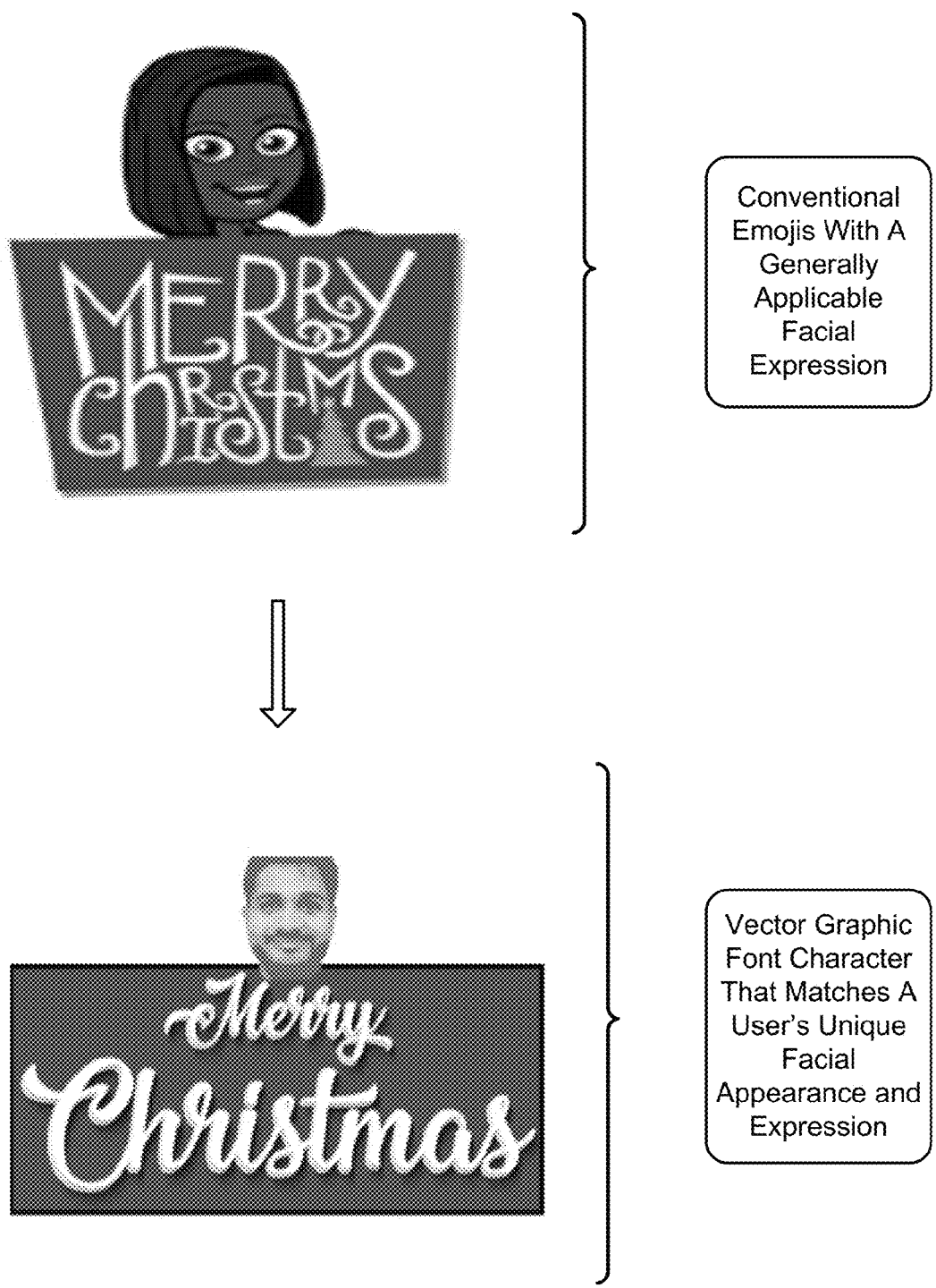
FIG. 7 depicts a comparison of emojis generated using conventional techniques and a vector graphic font character that matches a particular user's facial expression.

FIG. 7 depicts a comparison of an emoji generated using conventional techniques with the vector graphic font character generated by the vector graphic font generation system 104 described herein. An example of a conventional emoji shows a generalized cartoon like digital image of a woman with a smiling expression. An emoji with such an expression can be indicative of a number of different users. In contrast, the vector graphic font character shown below depicts an image of a particular user's face with a unique and user specific facial expression.

In this way, the vector graphic font generation system 104 addresses the limitations present in conventional techniques of generating emojis and emoticons. In particular, unlike conventional techniques, the vector graphics generated using the system described herein precisely matches a user's facial expression as depicted in a digital image. In addition, the system stores the graphic is SVG format, thereby enabling resizing and adjustment of the graphic without a loss in quality or resolution. The system also generates a font character from the vector graphic that is supported by and accessible in a number of applications and environments. Thus, vector graphic font generation system 104 enables the expression of a wide spectrum of emotions in numerous applications using font characters that precisely match the unique facial appearances an expressions of users as depicted in digital images.

Example System and Device

Figure 8:
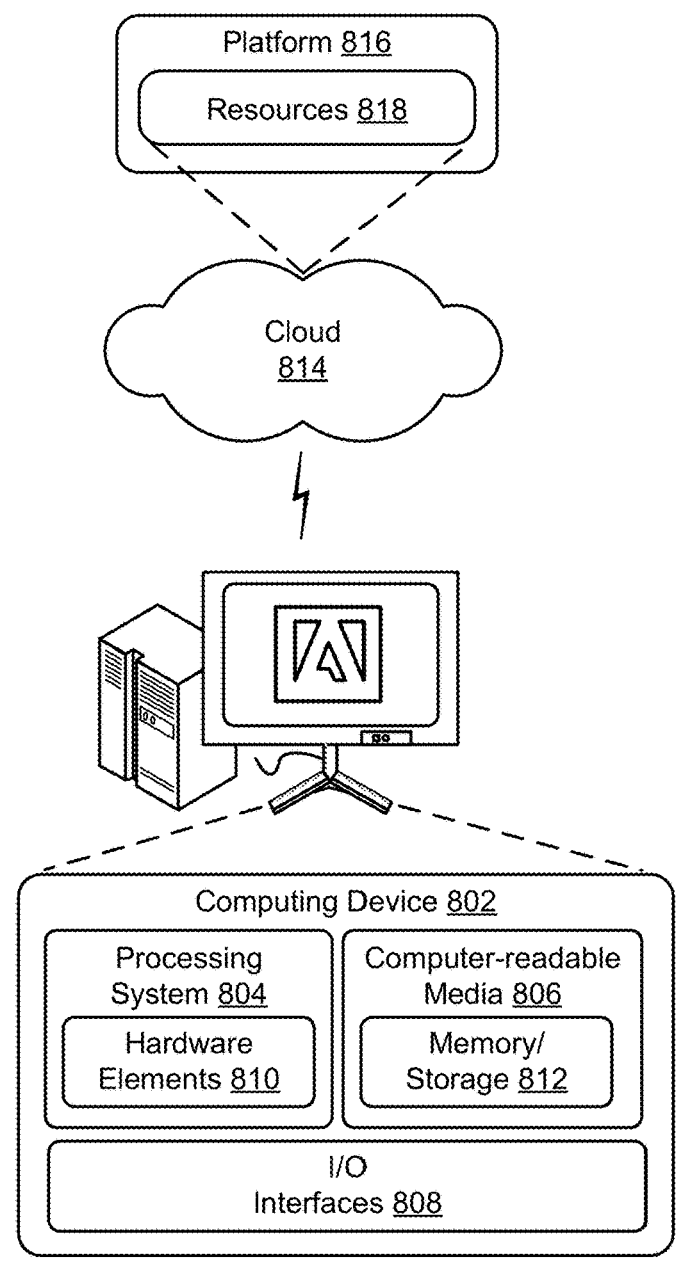
FIG. 8 illustrates an example system including various components of an example device that can be implemented as any type of computing device as described and/or utilized with references to FIGS. 1-7 in order to implement examples of the techniques described herein.

FIG. 8 illustrates an example system generally at 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

The invention claimed is:

1. In a digital content rendering environment, a method of generating a font character from a digital image using a computing device, the method comprising:
    receiving, by the computing device, the digital image that includes a facial region of a user, the facial region corresponding to a facial expression of the user;
    detecting, by the computing device, the facial region included in the digital image;
    generating, by the computing device, a segmented digital image that includes the facial region responsive to the detecting;
    generating, by the computing device, a vector graphic from the segmented digital image by converting a format of the segmented digital image into a vector graphic format, the vector graphic including the facial region of the user;
    generating, by the computing device, a font character based on the vector graphic that includes the facial region of the user; and
    outputting, by the computing device, the font character on a display device.

2. The method as described in claim 1, wherein the generating of the font character comprises mapping the vector graphic to a Unicode character.

3. The method as described in claim 2, wherein the generating of the font character further comprises:
    mapping the Unicode character with a glyph identifier; and
    storing the mapping of the Unicode character with the glyph identifier in a character to glyph correspondence table.

4. The method as described in claim 1, wherein the font character is accessible via a glyph index that indexes a plurality of font characters.

5. The method as described in claim 1, further comprising:
    applying a digital effect to the segmented digital image, the digital effect including digital smoothing or a digital color overlay.

6. The method as described in claim 1, wherein the generating of the segmented digital image comprises:
    generating cells within a boundary indicator associated with the facial region, the cells overlaying the facial region;
    generating markers associated with the cells;
    identifying an overlapping portion within the boundary indicator based on the markers; and
    extracting the overlapping portion within the boundary indicator.

7. The method as described in claim 6, further comprising implementing a partitioning algorithm on the overlapping portion.

8. The method as described in claim 6, wherein the markers include an arc shape or a circular shape.

9. In a digital content rendering environment, a system comprising:
    a detection module implemented at least partially in hardware of a computing device to detect an object included in a digital image, the object is a facial region of a user;
    a segmentation module implemented at least partially in hardware of the computing device to segment the digital image responsive to the detecting of the object;
    a vector graphic generation module implemented at least partially in hardware of the computing device to generate a vector graphic based on the segmented digital image by converting a format of the segmented digital image into a vector graphic format, the vector graphic including the object that is the facial region of the user; and
    a font character generation module implemented at least partially in hardware of the computing device to generate a font based on the vector graphic that includes the object that is the facial region of the user.

10. The system as described in claim 9, wherein the font character generation module generates the font character based on the vector graphic by mapping the vector graphic to a Unicode character.

11. The system as described in claim 10, wherein the generating of the font character by the font character generation module further comprises:
    mapping the Unicode character with a glyph identifier; and
    storing the mapping of the Unicode character with the glyph identifier in a character to glyph correspondence table.

12. The system as described in claim 9, wherein the font character is accessible via a glyph index that indexes a plurality of font characters.

13. The system as described in claim 9, further comprising:
    a digital effect inclusion module implemented at least partially in hardware of the computing device to apply one or more digital effects to the segmented digital image, the one or more digital effects including one or more of digital smoothing or digital color overlay.

14. The system as described in claim 9, wherein the segmentation module segments the digital image by:
    generating cells within a boundary indicator associated with the object, the cells overlaying the object;
    generating markers associated with the cells;
    identifying an overlapping portion within the boundary indicator based on the markers; and
    extracting the overlapping portion within the boundary indicator.

15. The system as described in claim 14, wherein the segmentation module is further configured to implement a partitioning algorithm on the overlapping portion.

16. The system as described in claim 14, wherein the markers associated with the boundary indicator include an arc shape or a circular shape.

17. In a digital content rendering environment, a system for generating a font character from a digital image using a computing device, the system comprising:

means for detecting an object in the digital image, the object is a facial region of a user;

means for generating a segmented digital image that includes the object responsive to the detecting;

means for generating a vector graphic from the segmented digital image by converting a format of the segmented digital image into a vector graphic format, the vector graphic including the object that is the facial region of the user; and means for generating a font character associated with the object based on the vector graphic that includes the object that is the facial region of the user.

18. The system as described in claim 17, wherein the generating of the font character based on the vector graphic comprises mapping the vector graphic to a Unicode character.

19. The system as described in claim 18, further comprising:

means for mapping the Unicode character with a glyph identifier; and means for storing the mapping of the Unicode character with the glyph identifier in a character to glyph correspondence table.

20. The system as described in claim 17, wherein the font character is accessible via a glyph index that indexes a plurality of font characters.

\* \* \* \* \*